United States Patent
Maheshwari et al.

(10) Patent No.: US 9,094,202 B2
(45) Date of Patent: Jul. 28, 2015

(54) UTILIZING HARQ FOR UPLINK GRANTS RECEIVED IN WIRELESS COMMUNICATIONS

(75) Inventors: Shailesh Maheshwari, San Diego, CA (US); Srividhya Krishnamoorthy, San Diego, CA (US); Vanitha A. Kumar, San Diego, CA (US); Arnaud Meylan, Bois-Colombes (FR)

(73) Assignee: QUALCOMM Incorporated, San Diego, CA (US)

( * ) Notice: Subject to any disclaimer, the term of this patent is extended or adjusted under 35 U.S.C. 154(b) by 1100 days.

(21) Appl. No.: 12/501,219

(22) Filed: Jul. 10, 2009

(65) Prior Publication Data

US 2010/0037113 A1    Feb. 11, 2010

Related U.S. Application Data

(60) Provisional application No. 61/087,307, filed on Aug. 8, 2008, provisional application No. 61/088,257, filed on Aug. 12, 2008.

(51) Int. Cl.
*H04L 12/40* (2006.01)
*H04L 1/16* (2006.01)
(Continued)

(52) U.S. Cl.
CPC ............ *H04L 1/1822* (2013.01); *H04L 1/1657* (2013.01); *H04L 1/1812* (2013.01); *H04L 1/1829* (2013.01); *H04L 1/1896* (2013.01)

(58) Field of Classification Search
None
See application file for complete search history.

(56) References Cited

U.S. PATENT DOCUMENTS 5,673,253 A   9/1997  Shaffer
6,950,399 B1  9/2005  Bushmitch et al.
(Continued)

FOREIGN PATENT DOCUMENTS

CN   1878052 A   12/2006
EP   1009184 A2   6/2000
(Continued)

OTHER PUBLICATIONS

3GPP: "Technical Specification Group Radio Access Network; Evolved Universal Terrestrial Radio Access (E-UTRA) Medi urn Access Control (MAC) protocol specification (Rel ease 8)" Internet Citation, [Online] pp. 13-20, XP002539526 Retrieved from the Internet: URL: http://www.3gpp.org/ftp/Specs/archive/36-series/36.321/> [retrieved on Aug. 31, 2009] p. 16, paragraph 5.3.1 p. 17, paragraph 5.3.2.2.

(Continued)

*Primary Examiner* — Ayaz Sheikh
*Assistant Examiner* — Sori Aga
(74) *Attorney, Agent, or Firm* — Liem T. Do

(57) ABSTRACT

Systems and methodologies are described that facilitate utilizing hybrid automatic repeat/request (HARQ) in system access communications. A HARQ entity is provided that manages a plurality of HARQ processes, which can typically use new data indicators (NDI) to determine when received data is a new transmission or retransmission. For resource grants, the HARQ entity can determine whether the communication is a new transmission or retransmission based on the type of message that contains the grant. In addition, an address comprised within the message, a previous use of the HARQ process, and/or the like can further be utilized to determine whether the message is a new transmission or retransmission. Once determined, the HARQ entity can provide the message to the appropriate HARQ process along with the indication of new transmission or retransmission.

23 Claims, 11 Drawing Sheets

(51) Int. Cl.

| | |
|---|---|
| H04L 1/00 | (2006.01) |
| G06F 11/00 | (2006.01) |
| G08C 25/02 | (2006.01) |
| H04L 1/18 | (2006.01) |
| H04L 1/14 | (2006.01) |

(56) References Cited

U.S. PATENT DOCUMENTS

| | | | |
|---|---|---|---|
| 7,321,589 B2 | 1/2008 | Lohr et al. | |
| 7,426,394 B2 | 9/2008 | Rinne | |
| 7,436,795 B2 | 10/2008 | Jiang | |
| 7,471,693 B2 | 12/2008 | Petrovic et al. | |
| 7,668,175 B2 | 2/2010 | Johnson et al. | |
| 7,693,156 B2 | 4/2010 | Liljestrom et al. | |
| 7,724,773 B2 | 5/2010 | Zhang et al. | |
| 7,848,308 B2 | 12/2010 | Lee et al. | |
| 7,899,075 B2 | 3/2011 | Whitehead et al. | |
| 7,961,680 B2 | 6/2011 | Park et al. | |
| 8,081,606 B2 | 12/2011 | Cai et al. | |
| 2002/0091831 A1 | 7/2002 | Johnson | |
| 2004/0021678 A1 | 2/2004 | Ullah et al. | |
| 2005/0135318 A1 | 6/2005 | Walton et al. | |
| 2005/0186959 A1 | 8/2005 | Vialen et al. | |
| 2007/0093209 A1* | 4/2007 | Agrawal et al. | 455/63.1 |
| 2007/0133458 A1 | 6/2007 | Chandra et al. | |
| 2007/0206531 A1 | 9/2007 | Pajukoski et al. | |
| 2007/0245202 A1* | 10/2007 | Kim et al. | 714/748 |
| 2007/0258540 A1 | 11/2007 | Ratasuk et al. | |
| 2008/0049851 A1 | 2/2008 | Nangia et al. | |
| 2008/0130588 A1 | 6/2008 | Jeong et al. | |
| 2008/0228878 A1* | 9/2008 | Wu et al. | 709/205 |
| 2008/0232283 A1 | 9/2008 | Jen | |
| 2008/0232317 A1 | 9/2008 | Jen | |
| 2008/0232329 A1 | 9/2008 | Jen | |
| 2008/0233940 A1 | 9/2008 | Jen | |
| 2008/0233941 A1 | 9/2008 | Jen | |
| 2008/0233964 A1 | 9/2008 | McCoy et al. | |
| 2008/0235314 A1 | 9/2008 | Lee et al. | |
| 2008/0273610 A1 | 11/2008 | Malladi et al. | |
| 2009/0003274 A1 | 1/2009 | Kwak et al. | |
| 2009/0041240 A1* | 2/2009 | Parkvall et al. | 380/247 |
| 2009/0141661 A1 | 6/2009 | Li et al. | |
| 2009/0156194 A1 | 6/2009 | Meylan | |
| 2009/0175253 A1 | 7/2009 | Wu et al. | |
| 2009/0201868 A1 | 8/2009 | Chun et al. | |
| 2009/0203377 A1 | 8/2009 | Kawasaki | |
| 2009/0252093 A1 | 10/2009 | Frenger | |
| 2009/0259910 A1 | 10/2009 | Lee et al. | |
| 2009/0290549 A1 | 11/2009 | Tiirola et al. | |
| 2009/0323607 A1 | 12/2009 | Park et al. | |
| 2010/0008242 A1 | 1/2010 | Schein | |
| 2010/0034162 A1 | 2/2010 | Ou et al. | |
| 2010/0040001 A1 | 2/2010 | Montojo et al. | |
| 2010/0074204 A1 | 3/2010 | Meylan | |
| 2010/0085927 A1* | 4/2010 | Torsner et al. | 370/329 |
| 2010/0093386 A1 | 4/2010 | Damnjanovic et al. | |
| 2010/0128648 A1 | 5/2010 | Lee et al. | |
| 2010/0135229 A1 | 6/2010 | Lohr et al. | |
| 2010/0142470 A1 | 6/2010 | Park et al. | |
| 2010/0197315 A1 | 8/2010 | Lindstrom et al. | |
| 2010/0272035 A1 | 10/2010 | Park et al. | |
| 2010/0309877 A1 | 12/2010 | Damnjanovic et al. | |
| 2010/0323736 A1 | 12/2010 | Fischer et al. | |
| 2010/0331003 A1 | 12/2010 | Park et al. | |
| 2011/0032891 A1 | 2/2011 | Lee et al. | |
| 2011/0170503 A1 | 7/2011 | Chun et al. | |
| 2011/0182245 A1* | 7/2011 | Malkamaki et al. | 370/329 |
| 2013/0163549 A1 | 6/2013 | Montojo et al. | |

FOREIGN PATENT DOCUMENTS

| | | | |
|---|---|---|---|
| EP | 1784036 A1 | 5/2007 | |
| JP | 2009535966 A | 10/2009 | |
| RU | 2280929 C1 | 7/2006 | |
| RU | 2304348 C2 | 8/2007 | |
| RU | 2313197 C2 | 12/2007 | |
| TW | I362850 B | 4/2012 | |
| WO | 2004064272 A1 | 7/2004 | |
| WO | 2006099225 A1 | 9/2006 | |
| WO | 2007011180 A1 | 1/2007 | |
| WO | 2007052972 A1 | 5/2007 | |
| WO | WO2007091831 | 8/2007 | |
| WO | 2007116985 A1 | 10/2007 | |
| WO | 2007119542 A1 | 10/2007 | |
| WO | 2007126302 A1 | 11/2007 | |
| WO | 2008042889 A1 | 4/2008 | |
| WO | WO2008041936 A1 | 4/2008 | |
| WO | 2008050428 A1 | 5/2008 | |
| WO | WO2008055235 | 5/2008 | |
| WO | 2008085959 A1 | 7/2008 | |

OTHER PUBLICATIONS

Amitava Ghosh, et al., "Random Access Design for UMTS Air-Interface Evolution" Vehicular Technology Conference, 2007. VTC2007-Spring. IEEE 65th, IEEE, PI, Apr. 1, 2007, pp. 1041-1045, XP031092788 ISBN: 978-1-4244-0266-3.

Ericsson, "Format of Random Access Response", 3GPP TSG-RAN WG#60, Tdoc R2-074938, Jeju Korea, Nov. 5-9, 2007.

Ericsson, "LTE PDCP Header Content", TSG-RAN WG2 Meeting #59bis, R2-074477, Shanghai, China, Oct. 8-12, 2007.

Huawei: "HARQ process Id of DL persistent scheduling" 3GPP Draft; R2-083518, 3rd Generation Partnership Project (3GPP), Mobile Competence Centre ; 650, Route Des Lucioles ; F-06921 Sophia-Antipolis Cedex ; France, vol. RAN WG2, no. Warsaw, Poland; Jun. 24, 2008 XP050140894 [retrieved on Jun. 24, 2008].

International Search Report and Written Opinion—PCT/US2009/053175, International Search Authority—European Patent Office—Mar. 4, 2010.

LG Electronics Inc: "Handling of Received UL Grant in RA procedure" Aug. 12, 2008, 3GPP Draft; R2-084388 CR on Handling of Received UL Grant in RA Procedure_R1, 3RD Generation Partnership Project (3GPP), Mobile Competence Centre ; 650, Route Des Lucioles ; F-06921 Sophia-Antipolis Cedex ; France , XP050319458 [retrieved on Aug. 12, 2008].

LG Electronics Inc: "Handling of Received UL Grant in RA procedure" 3GPP Draft; R2-084387 Handling of Received UL Grant in RA PrOcedure_R1, 3rd Generation Partnership Project (3GPP), Mobile Competence Centre ; 650, Route Des Lucioles ; F-06921 Sophia-Antipolis Cedex ; France, no. Jeju; Aug. 12, 2008, XP050319457.

LG Electronics Inc: "Re-Transmission of Persistent Scheduling" 3GPP Draft; R2-082260 Retransmission of Persistent Scheduling, 3rd Generation Partnership Project (3GPP), Mobile Competence Centre ; 650, Route Des Lucioles ; F-06921 Sophia-Antipolis Cedex ; France, vol. Ran WG2, no. Kansas City, USA; Apr. 29, 2008, XP050140021 [retrieved on Apr. 29, 2008].

Motorola: "LTE Random Access Procedure", 3GPP TSG-RAN WG2#53, [On line] vol. R2-061463, May 8-12, 2006, p. 1-4 XP007905045 Shanghai, China URL:http://www.3gpp.org/ftp/tsg_ran/WG2_RL2/TSGR2_53/Documents/>.

Park, et al., Provisional U.S. Appl. No. 60/945,090, filed Jun. 19, 2007, pp. 1-3, "Method Related to Controlling Wireless Resources and Transmitting Data in a Wireless Communication System".

Park, et al., Provisional U.S. Appl. No. 60/983,563, filed Oct. 29, 2007, pp. 1-13, "Handling of HFN Desynchronization".

QUALCOMM Europe et al: "Handling of Uplink Grant in Random Access Response" 3GPP Draft; R1-083439, 3rd Generation Partnership Project (3GPP), Mobile Competence Centre ; 650, Route Des Lucioles ; F-06921 Sophia-Antipolis Cedex ; France, no. Jeju; Sep. 5, 2008, XP050316800.

QUALCOMM Europe, "PRACH and Message3 power control", 3GPP TSG-RAN WG1 #53bis, R1-082551, Jun. 30-Jul. 4, 2008, Warsaw, Poland.

QUALCOMM Europe: "Handling of Uplink Grant in Random Access Response" 3GPP Draft; R1-083186, 3rd Generation Partnership Project (3GPP), Mobile Competence Centre ; 650, Route Des Lucioles ; F-06921 Sophia-Antipolis Cedex ; France, no. Jeju; Aug. 13, 2008, XP050316617.

(56) References Cited

OTHER PUBLICATIONS

QUALCOMM Europe: "NDI and Message 3" 3GPP Draft; R2-084156 NDI and MSG3, 3RD Generation Partnership Project (3GPP), Mobile Competence Centre ; 650, Route Des Lucioles ; F-06921 Sophia-Antipolis Cedex ; France, no. Jeju; Aug. 12, 2008, XP050319292.

RAN1, "Reply to RAN2 LS on RACH Power Control Optimisation Use case", 3GPP TSG RAN WG2 Meeting #61 R2-080652, Sorrento, Italy, Feb. 11-15, 2008.

TSG RAN WG 2, "Uplink grant format in Random Access Response" 3GPP TSG-RAN WG2 Meeting #62bis, R2-083779, Jun. 30-Jul. 4, 2008, Warsaw Poland.

TSG-RAN WG1, "LS reply on PDCCH for DL data arrival and random access response format", 3GPP TSG RAN WG2 Meeting #62bis, R2-083061, Warsaw, Poland, Jun. 30-Jul. 4, 2008.

Universal Mobile Telecommunications System (UMTS); Medium Access Control (MAC) protocol specification (3GPP TS 25.321 version 7.8.0 Release 7);ETSI TS 125 321 ETSI Standards, LIS, Sophia Antipolis Cedex, France, vol. 3-R2, No. V7.8.0, Apr. 1, 2008, XP014041738 ISSN: 0000-0001 p. 89, paragraph 11.6.2.1—p. 90, paragraph 11.6.2.2 p. 96, paragraph 11.6.3.3. p. 97, paragraph 11.6.4.2.

3GPP TS 36.321 V8.2.0 (May 2008), 3rd Generation Partnership Project; Technical Specification Group Radio Access Network; Evolved Universal Terrestrial Radio Access (E-UTRA) Medium Access Control (MAC) protocol specification (Release 8), May 2008.

3GPP; Technical Specification Group Radio Access Network;: "TS 36.300 V8.2.0—Evolved Universal Terrestrial Radio Access (E-UTRA) and Evolved Universal Terrestrial Radio Access Network (E-UTRAN) ; Overall description ; Stage 2" 3rd Generation Partnership Project; Technical Specification (TS), vol. 36.300, No. v8.2.0, Sep. 1, 2007, XP002595686.

3GPP TS 36.321 v2.0.0 (Nov. 2007) 3rd Generation Partnership Project; Technical Specification Group Radio Access Network; Evolved Universal Terrestrial Radio Access (E-UTRA) Medium Access Control (MAC) protocol specification (Release 8) vol. 36.321, Nr:V2.0.0, pp. 1-23 XP002521802.

LG Electronics Inc, "NDI and Msg3", 3GPP TSG-RAN2 Meeting #62bis R2-083723, Jun. 30, 2008, pp. 1-3.

Taiwan Search Report—TW098126773—TIPO—Oct. 18, 2012.

"Universal Mobile Telecommunications System (UMTS); Medium Access Control (MAC) protoco specification (3GPP TS 25.321 version 7.9.0 Release 7); ETSI TS 125 321" ETSI Standard, European Telecommunications Standards Institute (ETSI), Sophia Antipolis Cedex, France, vol. 3-R2, No. V7.9.0, Jul. 1, 2008, XP014042116 cited in the application paragraph [11.2.1] paragraph [11.2.2] paragraph [11.2.3].

3rd Generation Partnership Project: "3GPP TS 36.213 V8.4.0 Technical Specification Group Radio Access Network; Evolved Universal Terrestrial Radio Access (E-UTRA); Physical layer procedures (Release 8)" [0nline] Sep. 1, 2008, pp. 1-60, XP002581188 Retrieved from the Internet: URL:http://www.3gpp.org/ftp/Specs/archive/36_series/36.213/36213-840.zip> [retrieved on May 6, 2010] p. 30-p. 32.

"3rd Generation Partnership Project; Technical Specification Group Radio Access Network; Evolved Universal Terrestrial Radio Access (E-UTRA); Physical layer procedures (Release 8)" 3GPP Standard; 3GPP TS 36.213, 3RDGENERATION Partnership Project (3GPP), Mobile Competence Centre; 650, Route Deslucioles; F-06921 Sophia-Antipolis Cedex; France, No. V8.3.0, Nov. 2008, pp. 1-46.

LG Electronics: "Optimized RA response reception", 3GPP TSG-RAN WG2 #59, R2-073327, Aug. 2007.

TSG-RAN WG1: "LS reply on PDCCH for DL data arrival and random access response format", 3GPP TSG RAN WG1 Meeting #53, R1-082251, May 5-9, 2008.

3GPP TS 25.321: "3rd Generation Partnership Project,Technical Specification Group Radio Access Network;Medium Access Control (MAC) protocol specification", version 7.9.0, Release 7, May, 2008, pp. 89-90, 96-98.

LG Electronics Inc: "MAC Header Format for Random Access Response", 3GPP TSG-RAN WG2 #60, R2-074779, 2007-11.

\* cited by examiner

UTILIZING HARQ FOR UPLINK GRANTS RECEIVED IN WIRELESS COMMUNICATIONS

CROSS-REFERENCE

This application claims the benefit of U.S. Provisional Application Ser. No. 61/087,307, filed Aug. 8, 2008, and entitled "GRANT IN MESSAGE 2 FLIPS NDI," as well as U.S. Provisional Application Ser. No. 61/088,257, filed Aug. 12, 2008, and entitled "GRANT IN MESSAGE 2 FLIPS NDI," the entireties of which are incorporated herein by reference.

BACKGROUND

I. Field

The present disclosure relates generally to wireless communications and more specifically to providing HARQ functionality for system access communications.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Automatic repeat/request (ARQ) technologies, such as hybrid-ARQ (HARQ), can be used between mobile devices and base stations to facilitate successful communications. For example, the base station can transmit signals to a mobile device, and the mobile device can transmit control data back to the base station indicating whether or not it successfully received data within the signal. If not, the base station can retransmit the signal. To this end, devices utilizing HARQ can have a HARQ entity that receives the data and determines whether it is a new transmission or retransmission based on a new data indicator (NDI) in the data. NDIs, however, are not always present in transmissions between the mobile devices and base stations, particularly for system access communications.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating hybrid automatic repeat/request (HARQ) support for system access communications in wireless networks. In one example, where a resource grant is received in a system access response, a HARQ entity that processes HARQ communication can consider the received response as a new transmission. In another example, where a resource grant is received over an established control channel and/or indicates a temporary device address, the HARQ entity can consider the grant as a retransmission since it can be inferred that the previous transmission has not reached its destination. In yet another example, where a new data indicator is present in a resource grant, the HARQ entity can ignore resource grants received on the established control channel indicating a temporary address in determining whether the indicator has been incremented. It is to be appreciated that where the indicator is determined as incremented by the HARQ entity, this can indicate that the grant is a new transmission. In this regard, HARQ functionality can be implemented for system access in wireless networks.

According to related aspects, a method for interpreting HARQ functionality in system access procedures is provided. The method includes receiving a communication comprising a resource grant from an access point in a wireless network. The method also includes determining whether the communication is a new transmission or retransmission based at least in part on a type thereof and providing the communication to a HARQ process along with an indication of new transmission or retransmission based on the determination.

Another aspect relates to a wireless communications apparatus. The wireless communications apparatus can include at least one processor configured to receive a response to a system access request comprising a resource grant from one or more access points in a wireless network and determine a type of the response. The processor is further configured to provide the response to a HARQ process along with an indication of new transmission or retransmission based at least in part on the type of the response. The wireless communications apparatus also comprises a memory coupled to the at least one processor.

Yet another aspect relates to a wireless communications apparatus that facilitates utilizing HARQ communications in system access procedures. The wireless communications apparatus can comprise means for receiving a communication from an access point in response to a system access request. The wireless communications apparatus can additionally include means for providing the communication to a HARQ process along with an indication of new transmission or retransmission determined based at least in part on a type of the communication.

Still another aspect relates to a computer program product, which can have a computer-readable medium including code for causing at least one computer to receive a communication comprising a resource grant from an access point in a wireless network. The computer-readable medium can also comprise code for causing the at least one computer to determine whether the communication is a new transmission or retransmission based at least in part on a type thereof. Moreover, the computer-readable medium can comprise code for causing the at least one computer to provide the communication to a HARQ process along with an indication of new transmission or retransmission based on the determination.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
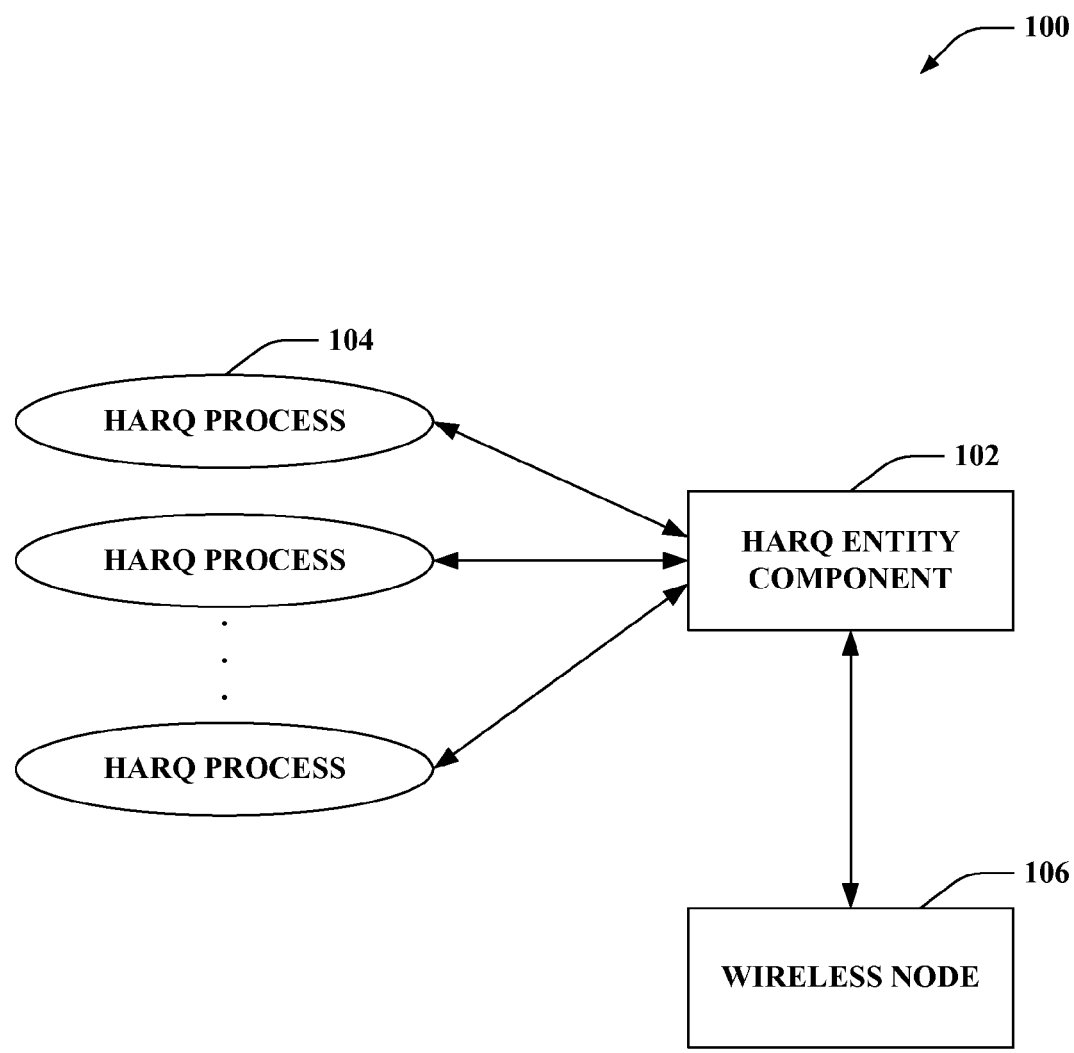
FIG. 1 is a block diagram of a system for communicating using hybrid automatic repeat/request (HARQ) in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 that facilitates hybrid automatic repeat/request (HARQ) communication in a wireless network. In particular, a HARQ entity component 102 is provided that manages a number of HARQ processes, such as HARQ process 104. The HARQ processes can be utilized to simultaneously receive and transmit communications in a wireless network independently of one another. A wireless node 106 is also depicted that can communicate with the HARQ entity component 102 over a wireless network. In one example, the HARQ entity component 102 can transmit data from a HARQ process 104 to the wireless node 106. The wireless node 106 can respond to the HARQ entity component 102 with control data regarding information about the response, such as a related process identifier, new data indicator (NDI), and/or the like. This can be communicated over a control channel, for example, and the HARQ entity component 102 can forward the response and related control data to the appropriate HARQ process 104 (which can be based on the received process identifier, in one example). A control channel can relate to one or more portions of frequency over one or more time periods that define the channel according to a wireless network. In one example, the portions of frequency over time can be portions of subcarriers in an OFDM configuration.

Based on the control data, the HARQ process 104 can determine whether the data is a new transmission or retransmission of previous data. Where data is new, the HARQ process can overwrite a related buffer and allow higher level applications to consume the data. Where the data is a retransmission, the HARQ process can combine the data with data previously received. In either case, the HARQ entity component 102 can transmit an acknowledgement (ACK) indicating the data was received successfully, or a non-acknowledgement (NAK) indicating data receipt was unsuccessful, back to the wireless node 106. In one example, determining whether data is successfully or unsuccessfully received can entail attempting to decode and/or demodulate the data from a received signal. Where a NAK is received, for example, the wireless node 106 can retransmit data specifying the same process identifier, and a false NDI, to the HARQ entity component 102. Thus, based at least in part on the NDI (e.g., whether the NDI has been incremented), the HARQ entity component 102 can determine whether given data is new or a retransmission and accordingly notify the appropriate HARQ process 104, as shown.

According to an example, a HARQ process 104 can receive a system access request for transmission over a wireless network. The HARQ entity component 102 can transmit the request to the wireless node 106, which can be a wireless node that provides access to a wireless network, for example. The wireless node 106 can receive the request and, in one example, transmit a system access response that includes a resource grant to the HARQ entity component 102. The HARQ entity component 102 can receive the response and consider it a new transmission, though an NDI is not received, as it is a response to the system access request. The HARQ entity component 102 can forward the grant to the appropriate HARQ process 104 indicating that it is a new transmission causing the HARQ process to overwrite a related buffer with the data, in one example. This can occur at the media access control (MAC) layer. In another example, an NDI can be provided within the system access response, as described herein.

In another example, the wireless node 106 can transmit a resource grant over a control channel established for a device to which the HARQ entity component 102 relates. Where the control channel relates to a temporary address of the device (e.g., until device makes this address permanent after resolving contention), the HARQ entity component 102 can consider the grant as a retransmission, since this can indicate contention has not yet been resolved (e.g., radio resource control (RRC) layer communication setup is not yet complete). Accordingly, the HARQ entity component 102 can deliver the resource grant to the appropriate HARQ process 104 and indicate the grant as a retransmission. It is to be appreciated that after contention is resolved, a persistent or semi-persistent identifier can be assigned to the related device.

Moreover, the HARQ entity component 102 can evaluate an NDI transmitted by the wireless node 106 (e.g., in control data) to determine whether data received from the wireless node 106 is a new transmission or a retransmission. Such evaluation can include, in one example, determining whether the NDI was incremented since a previous transmission. In so evaluating the NDI, the HARQ entity component 102 can ignore NDIs indicated in grants received over a control channel related to the temporary address of the device since these grants are considered retransmissions, as described. In this regard, HARQ functionality is provided for system access communications in wireless networks.

Figure 2:
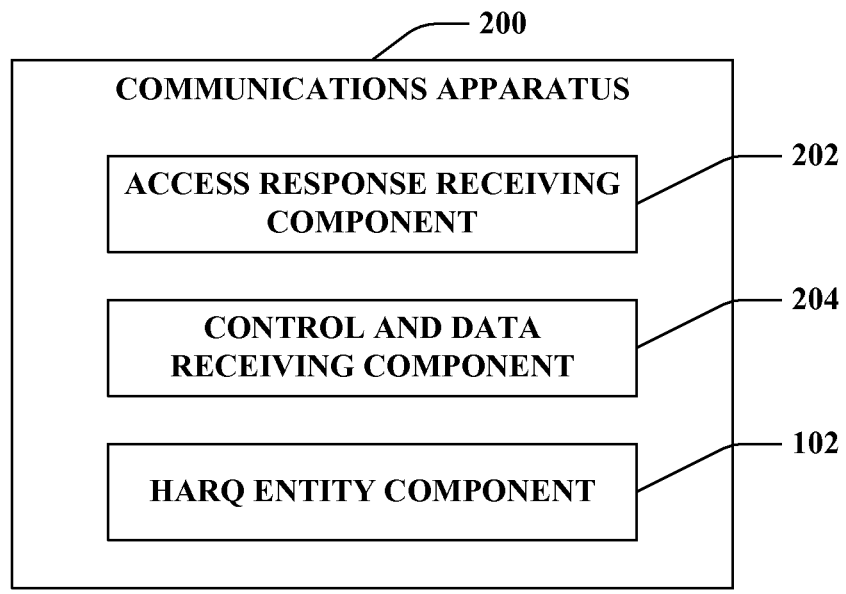
FIG. 2 is an illustration of an example communications apparatus for employment within a wireless communications environment.

Referring next to FIG. 2, a communications apparatus 200 that can participate in a wireless communications network is illustrated. The communications apparatus 200 can be a mobile device, base station, a portion thereof, or substantially any device that can communicate in a wireless network. The communications apparatus 200 can include an access response receiving component 202 that can receive system access responses in a wireless network, a control and data receiving component 204 that can obtain control information and/or data transmitted in a wireless network, and a HARQ entity component 102 that can manage a number of HARQ processes to facilitate HARQ communication, as described. As mentioned previously, the HARQ entity component 102 can manage the HARQ processes to allow simultaneous independent communication while adding repetition where needed to facilitate successful receipt of data. The HARQ entity component 102 can receive communications from devices in a wireless network and can provide the communications to appropriate HARQ processes indicating whether the communications are new or retransmissions, as described.

According to an example, the access response receiving component 202 can receive a system access response from a wireless node (not shown), which can be in response to a system access request, in one example. This can be received at a MAC layer, in one example. The access response receiving component 202 can forward the system access response to the HARQ entity component 102, which can determine whether the response contains a resource grant to facilitate subsequent communication. If so, the HARQ entity component 102 can consider the system access response as a new transmission since a system access response is likely a first communication with a related wireless node. It is to be appreciated that the resource grant can relate to one or more uplink data channel communication resources, for instance. In one example, the system access response can be a random access channel (RACH) response, which are received at specific times in a wireless network (e.g., switching from idle to active mode, system access after radio failure, some handover situations, data arriving before synchronization of a data channel, etc.). In this regard, the HARQ entity component 102 routes the response to the appropriate HARQ process indicating the response as a new transmission, in one example. Thus, the related HARQ process of the HARQ entity component 206 can overwrite data in the HARQ process buffer with the system access response for upper layer consumption, as described.

In another example, the control and data receiving component 204 can obtain control data and/or general data from one or more established control channels. For example, control channels can be established with a wireless device to facilitate accessing a wireless network. The control channels can be established along with a temporary address (e.g., temporary cell radio network temporary identifier (T-CRNTI), etc.) for the communications apparatus 200, which can be indicated in a system access response, until resources are scheduled. The control channels can also be established with a persistent and/or semi-persistent address (e.g., once resources are scheduled). In one example, the control and data receiving component 204 can receive one or more resource grants over one or more control channels. The control and data receiving component 204 can provide the one or more resource grants to the HARQ entity component 102. In one example, the communications apparatus 200 can give precedence to grants received from system access requests. In this example, where the control and data receiving component 204 receives a resource grant over a control channel related to a persistent or semi-persistent identifier (e.g., established following resource scheduling), the HARQ entity 102 can indicate new transmission to the related HARQ process assigned to receive the resource grant, for example, where there is an ongoing random access procedure. This can be so since the random access procedure is not complete.

Where the control and data receiving component 204 receives a resource grant over a control channel related to a temporary address assigned to the communications apparatus 200, the HARQ entity component 102 can indicate retransmission to the HARQ process assigned to receive the resource grant. The HARQ entity component 102 can so indicate retransmission since receiving the grant over the temporary address can imply that contention is not yet resolved, and thus a system access request was not received or was not yet processed. Moreover, once the access request is processed, the control and data receiving component 204 can receive a grant over a control channel related to a permanent address, as described, which can overwrite the buffer for the HARQ process containing the grant related to the temporary address control channel, for example. The HARQ entity component 102 can take the foregoing actions regardless of whether a new data indicator is included in the grant (and/or regardless of its value). In another example, the HARQ entity component 102 can determine, for a received communication, whether the NDI has been incremented as compared to previous transmissions (e.g., to conclude whether the communication is a new or retransmission). In this regard, the HARQ entity component 102 can ignore NDIs received for grants over the control channel related to the temporary address of the communications apparatus 200 since these grants are considered retransmissions, as described.

As shown, the HARQ entity component 102 receives communications from the access response receiving component 202 as well as the control and data receiving component 204; based on this, for example, the HARQ entity component 102 can determine a type of the communication (e.g., access response, control channel transmission, etc.) in determining whether the transmission is new or a retransmission, as described above.

Figure 3:
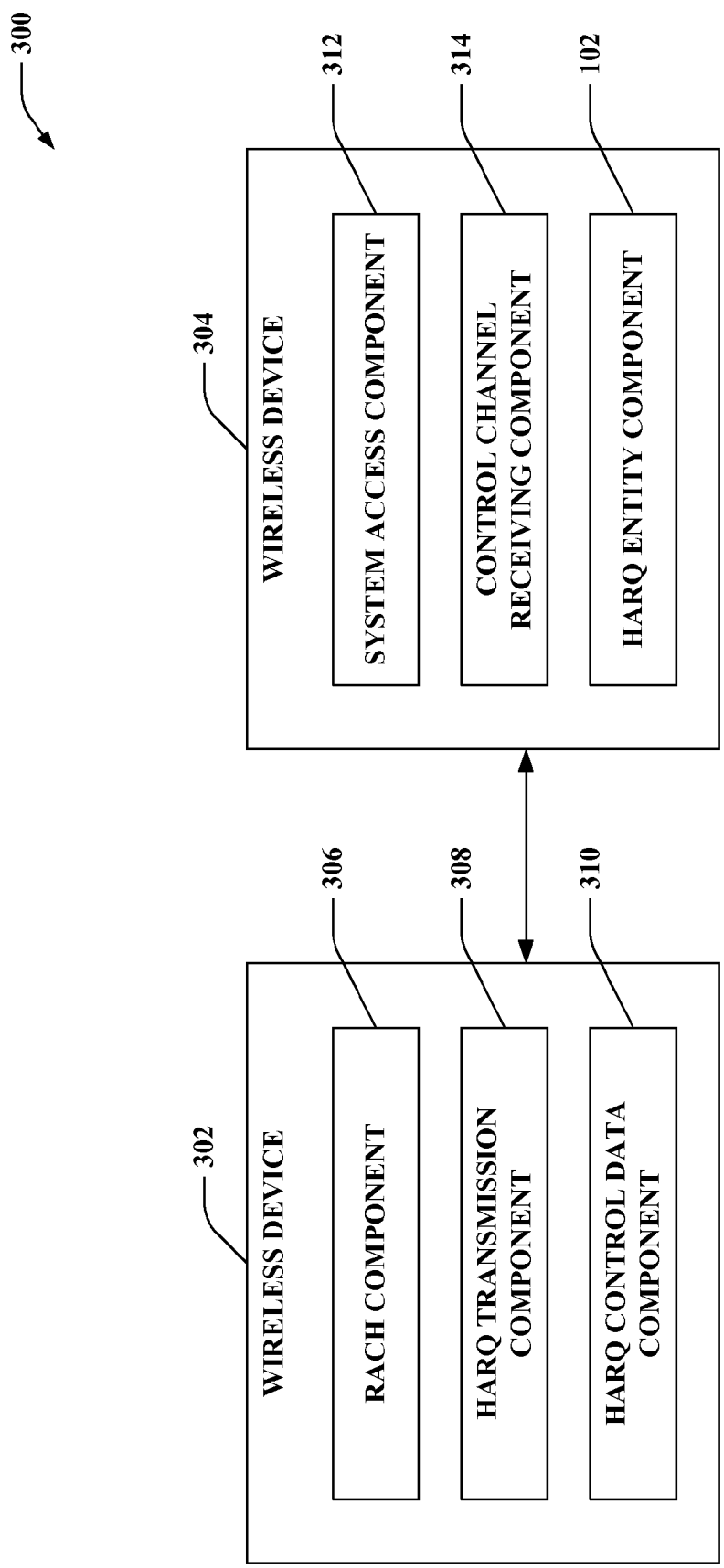
FIG. 3 illustrates an example wireless communication network that effectuates performing system access procedures using HARQ.

Now referring to FIG. 3, illustrated is a wireless communications system 300 that facilitates providing HARQ functionality for initial communications related to system access requests. Wireless device 302 and/or 304 can be a mobile device (including not only independently powered devices, but also modems, for example), a base station, and/or portion thereof. In one example, the wireless devices 302 and 304 can communicate using peer-to-peer or ad hoc technology where the devices 302 and 304 are of similar type. Moreover, system 300 can be a MIMO system and/or can conform to one or more wireless network system specifications (e.g., EV-DO, 3GPP, 3GPP2, 3GPP LTE, WiMAX, etc.). Also, the components and functionalities shown and described below in the wireless device 302 can be present in the wireless device 304 as well and vice versa, in one example; the configuration depicted excludes these components for ease of explanation.

Wireless device 302 can include a RACH component 306 that provides a RACH over which disparate devices can transmit requests (e.g., RACH preambles) to establish data channel resources with the wireless device 302 for communicating over a wireless network, a HARQ transmission component 308 that can transmit data to one or more disparate wireless devices using HARQ, and a HARQ control data component 310 that generates and transmits HARQ control data related to the HARQ transmission to one or more wireless devices. Wireless device 304 can include a system access component 312 that generates system access requests for transmission to one or more wireless devices and/or receives system access responses therefrom, a control channel receiving component 314 that establishes control channels with wireless devices and receives data transmitted thereover, and a HARQ entity component 102 that facilitates HARQ communication with one or more wireless devices. In one example, the HARQ transmission component 310 can additionally provide similar functionality as the HARQ entity component 102, as described below, and/or vice versa.

According to an example, the RACH component 306 can provide a RACH that allows wireless devices to transmit access requests to the wireless device 302. The system access component 312 can generate a request for system access, such as a RACH preamble, initial communication request, or a Message 1 transmission, and the HARQ entity component 102 can transmit the request over the RACH using a HARQ process (not shown), as described. The request can be generated, for example, when the wireless device 304 switches from idle to active mode, recovers from radio failure, initiates a communication handover, receives data before synchronization of a data channel, and/or the like. The RACH component 306 can receive the request and determine whether to provide a set of data channel resources to the wireless device 304. The HARQ transmission component 308 can transmit a response to the system access request; in one example, this can be sent as a RACH response, Message 2 transmission, and/or the like. The HARQ control data component 310 can transmit related control data where applicable (and/or where the wireless devices 302 and 304 have previously established a HARQ control channel).

The system access component 312 can receive the system access response and provide it to the HARQ entity component 102. The HARQ entity component 102 can evaluate the response to determine it is an access response (based at least in part on receiving it from the system access component 312) as well as to determine whether it contains a resource grant from the wireless device 302. The HARQ entity component 102 can provide the response to the HARQ process based on an indicated process identifier along with an indication of new transmission, as described previously. This can be regardless of any NDI that may or may not be transmitted with the response since a grant received in a system access response (such as a random access response, Message 2, etc.) can impliedly indicate a new transmission. This can be performed at a MAC layer, for example.

In another example, the random access response can comprise an NDI, which can be used by the HARQ entity component 102 to specify whether the response is a new transmission or retransmission. In one example, a random access response can resemble the following format:

| Field | Number of bits |
|---|---|
| Frequency hopping | 1 |
| Resource Block assignment | 5-10 depending on the system bandwidth, assuming maximum 8 RB allocation. |
| MCS | 4 |
| TPC | 4 |
| UL delay (TDD and FDD) | 1 |
| CQI request | 1 | where frequency hopping is a setting regarding whether or not to implement such hopping in communicating over granted resources, the resource block assignment indicates the granted resources, MCS is the modulation and control scheme, TPC is terminal power control, uplink delay is a delay in transmitting over the resources, and CQI request is a channel quality indicator request. In this example, substantially any bit can be borrowed for indicating NDI. For instance, a bit can be borrowed from the resource block assignment since only 8 are typically used, TPC can be scaled down to 3 bits where the last bit can be NDI, and/or the like, for example.

In addition, control channels can be provided to facilitate communicating channel quality information between wireless device 302 and wireless device 304. In one example, the control channel receiving component 314 can obtain the parameters for subsequent utilization of the control channels. Moreover, the HARQ transmission component 308 and/or HARQ control data component 310 can transmit control data to the wireless device 304 over the channels once established. In one example, the control data can be shared among multiple wireless devices, and the HARQ transmission component 308 and/or HARQ control data component 310 can include identifiers related to the wireless devices in the control data. In one example, the identifiers can be temporary identifiers received in a system access response that does not contain a resource grant or more persistent or semi-persistent identifiers that can be received in a resource grant. In addition, the wireless device 302 can transmit resource grants over the control channels. For instance, after the system access component 312 transmits the system access request, the RACH component 306 can generate a response that may not contain a resource grant. In this regard, the HARQ transmission component 308 and/or the HARQ control data component 310 can provide a resource grant over one or more control channels, such as a physical downlink control channel (PDCCH) and/or the like.

In this example, the control channel receiving component 314 can obtain the resource grant over the control channel and forward the grant to the HARQ entity component 102 so the HARQ entity component 102 can match the grant to a HARQ process that transmitted the request. Again, the HARQ entity component 102 can determine that this is a control channel transmission based at least in part on receiving it from the control channel receiving component 314. Where the resource grant comprises a temporary identifier corresponding to the wireless device 304 (e.g., an identifier received in a system access or RACH response), the HARQ entity component 102 can provide the resource grant data to the HARQ process along with an indication of retransmission. As described, retransmission can be indicated since utilizing the temporary identifier implies that the wireless device 302 did not receive or process the system access request since the contention is not resolved and RACH procedure is not complete.

Where the resource grant comprises a persistent or semi-persistent identifier corresponding to the wireless device 304 (e.g., an identifier received upon acquiring data channel resources) and there is an ongoing system access procedure (e.g., the system access component 312 has received a system access response, communicated a scheduled transmission, but has not received a HARQ ACK to the scheduled transmission), the HARQ entity component 102 can provide the resource grant data to the HARQ process along with an indication of new transmission, as described. In another example, the HARQ entity component 102 can determine new data transmissions from an indicated NDI, as described. When determining whether an NDI has been incremented, the HARQ entity component 102 can ignore resource grants transmitted over the control channel corresponding to a temporary address of the wireless device 304, as described.

Figure 4:
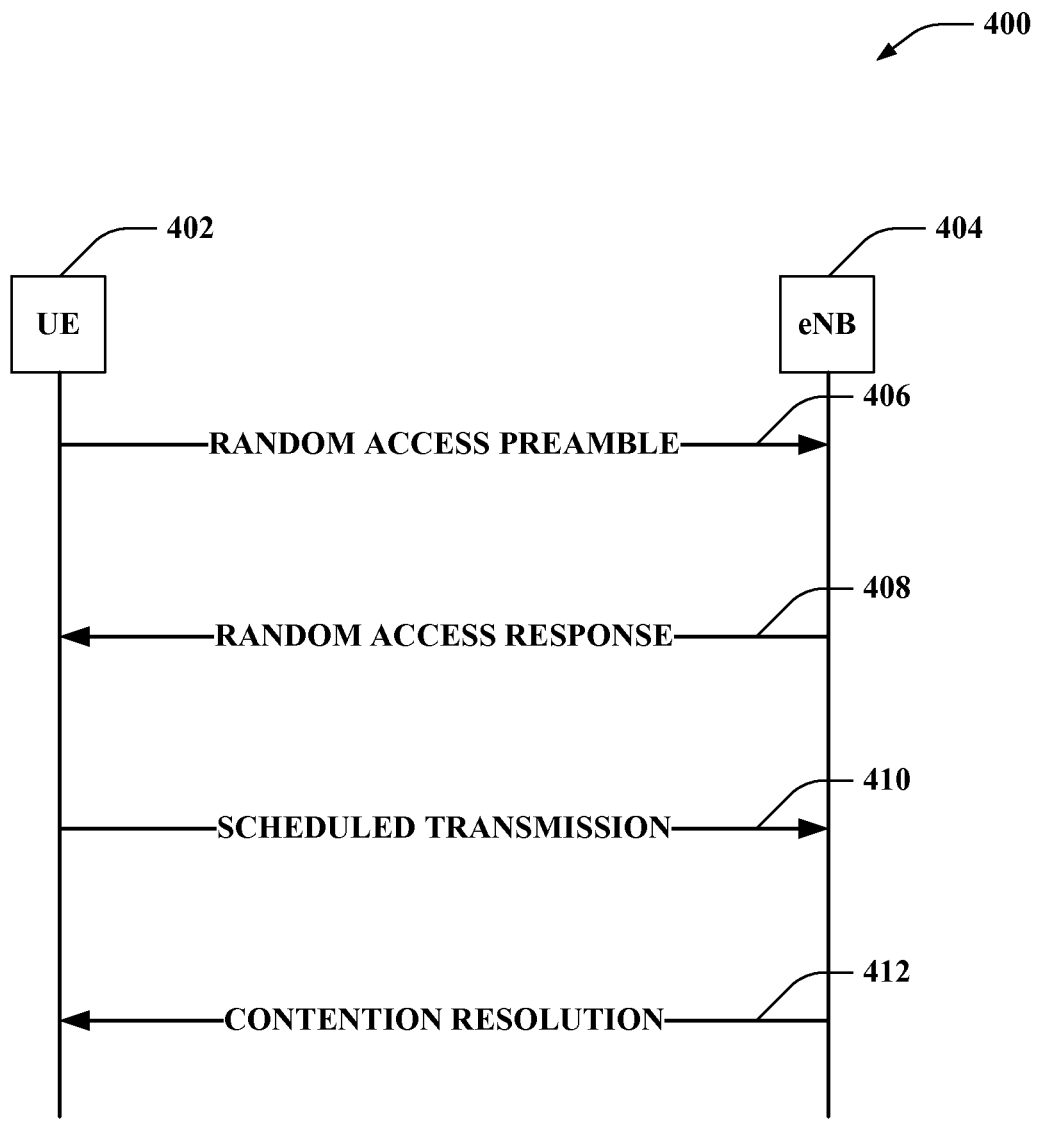
FIG. 4 illustrates example wireless communication system for communicating system access messages using HARQ.

Referring to FIG. 4, a diagram 400 is provided that illustrates example communications to establish access in a wireless network. A UE 402 and eNB 404 are provided such that the eNB 404 can facilitate network communication with the UE 402. The UE 402 can transmit a random access preamble

406 to the eNB 404 to initiate communication therewith. In one example, the UE 402 can transmit the random access preamble when switching from idle to active mode, recovering from radio failure, initiating a communication handover, receiving data before synchronization of a data channel, and/or the like, as described. This can be referred to as a Message 1 transmission, for example. The eNB 404 can transmit a random access response 408 to the UE 402; this can be referred to as a Message 2 transmission, in one example, and can comprise a random access preamble identifier, timing alignment information, temporary address for the UE 402 (which can become persistent following RRC contention resolution), and/or the like. As described, the random access response 408 can, in one example, include a resource grant. If so, then a HARQ entity of the UE 402 (not shown) can indicate the random access response 408 is a new transmission for HARQ purposes, as described.

The UE 402 can transmit a first scheduled transmission 410 to the eNB 404, which can be referred to as a Message 3 transmission. In one example, this transmission 410 can be used to establish RRC connection, RRC re-establishment, RRC handover, and/or the like. In addition, the scheduled transmission 410 can be transmitted using resource grants received in the random access response 408 or otherwise. The eNB 404 can transmit a contention resolution 412 to the UE 402 in response to the scheduled transmission to resolve RRC layer communication and assign a persistent or semi-persistent address to the UE 402 for subsequent communications. It is to be appreciated that the foregoing is one example of a random access procedure utilizing the subject matter described herein to indicate the random access response as a new transmission; in addition, other configurations, including a non-contention based random access procedure for example, are within the scope of the subject matter described herein.

Figure 5:
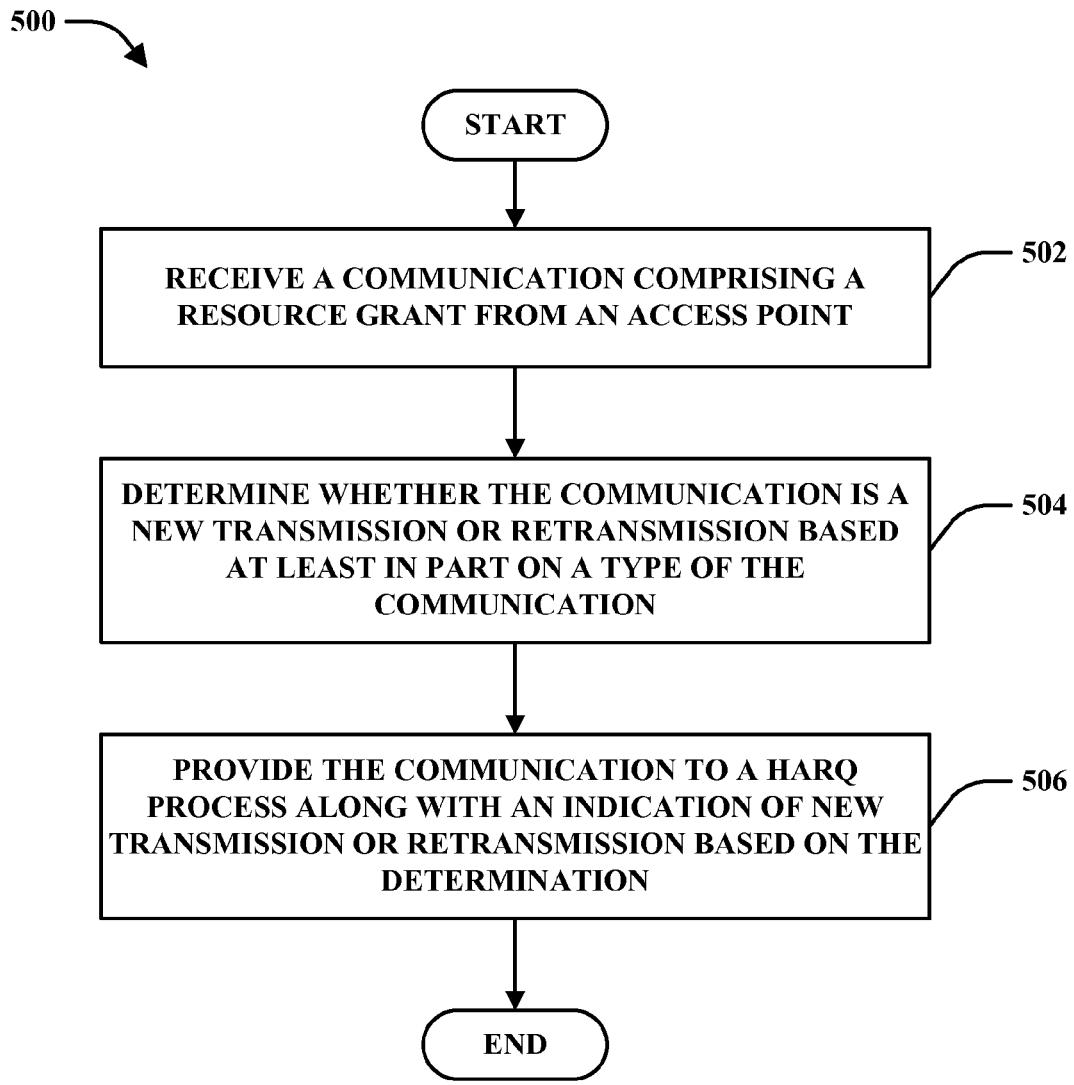
FIG. 5 is a flow diagram of an example methodology that facilitates utilizing HARQ in communicating system access messages.
Figure 6:
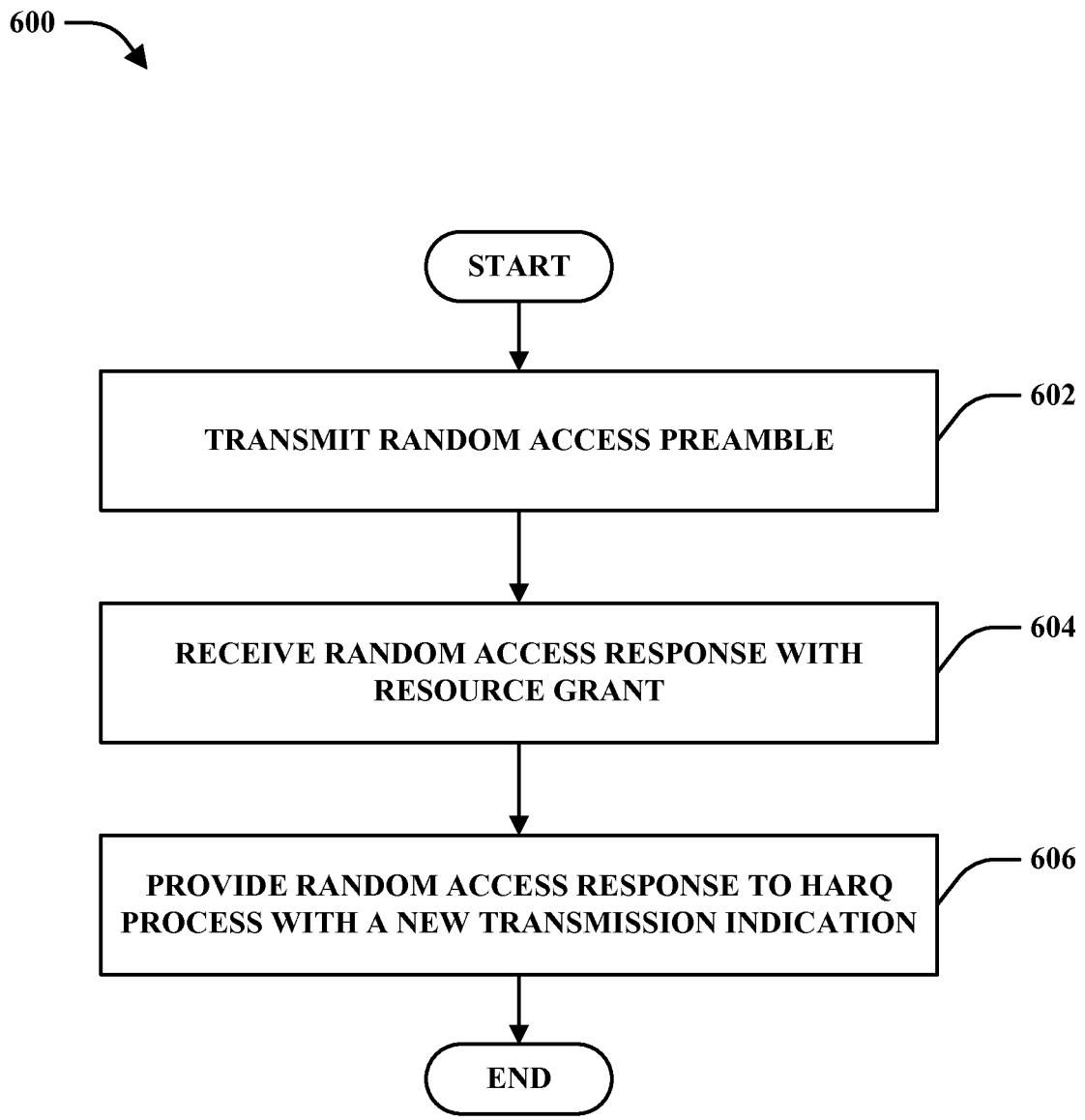
FIG. 6 is a flow diagram of an example methodology that implements HARQ for resource grants in random access responses.
Figure 7:
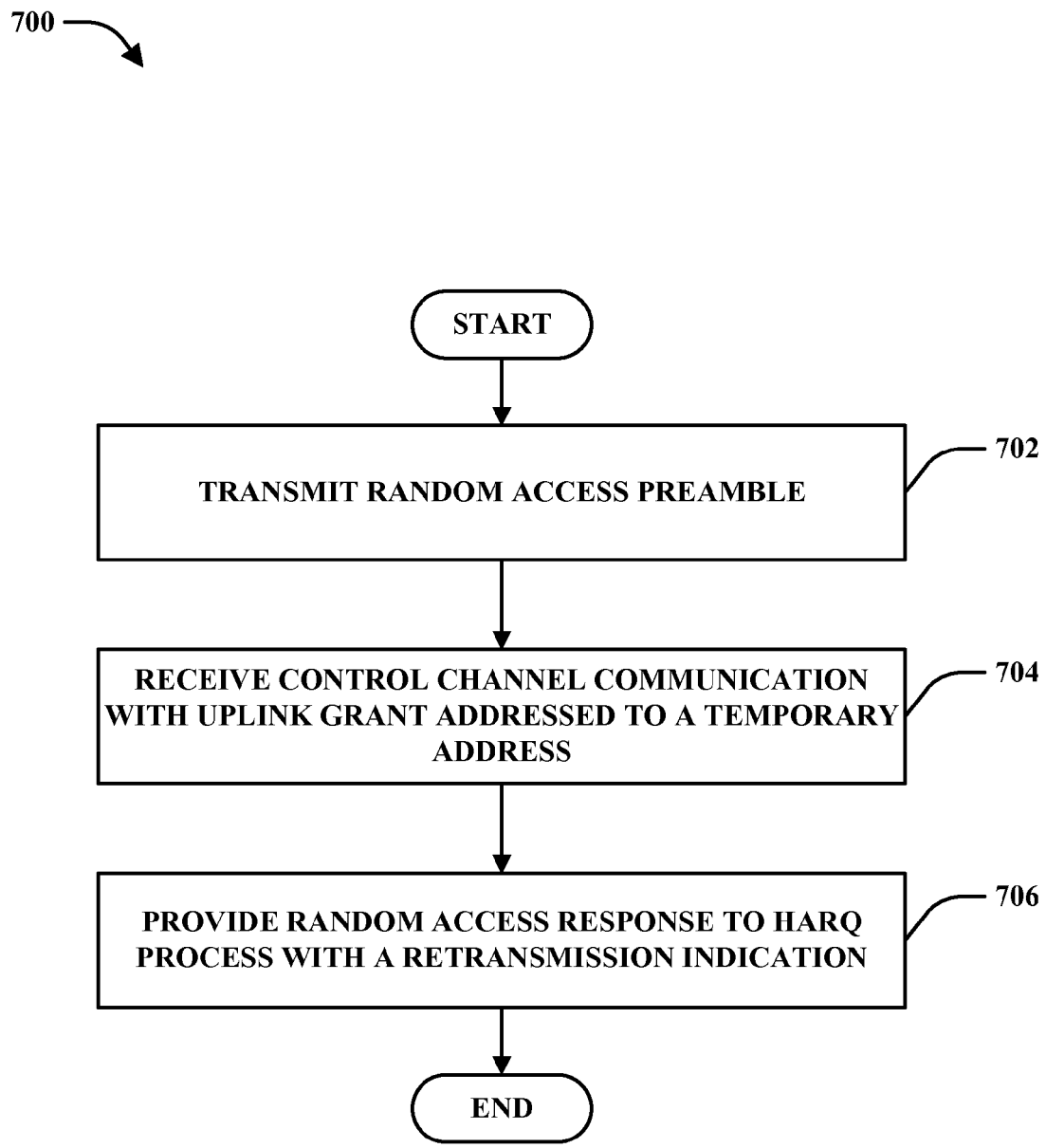
FIG. 7 is a flow diagram of an example methodology for providing HARQ for resource grants over control channels.

Referring now to FIGS. 5-7, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 5, illustrated is a methodology 500 for providing HARQ support in system access and/or random access procedures. At 502, a communication comprising a resource grant can be received from an access point. As described, this can be a random access response or other system access message, a control channel transmission, and/or the like. At 504, it can be determined whether the communication is a new transmission or retransmission of data based at least in part on a type of the communication. For example, as described, where the communication is a random access response with a resource grant, this can indicate a new transmission. It is to be appreciated that the determination at 504 can be based on other factors as well, such as a temporary or persistent device address and/or the like, as described. At 506, the communication can be provided to a HARQ process along with an indication of a new transmission or retransmission based on the determination at 504. In addition, it is to be appreciated that the communication can comprise an identifier related to the HARQ process to facilitate association therewith. In this regard, HARQ functionality is provided for system access procedures.

Turning to FIG. 6, a methodology 600 is illustrated for providing HARQ in random access procedures. At 602, a random access preamble can be transmitted. In one example, the preamble can be transmitted to one or more access points to facilitate communication establishment therewith. For example, the preamble can be transmitted when switching from an idle to an active mode, recovering from radio failure, initiating a communication handover, receiving data before synchronization of a data channel, and/or the like, as described. At 604, a random access response can be received with a resource grant. In this regard, the response can be a first response after the random access preamble and is likely a new transmission. At 606, the random access response can be accordingly provided to an associated HARQ process with a new transmission indicator. This can occur regardless of an NDI that may or may not be presented with the random access response, for example, as described.

FIG. 7 illustrates a methodology 700 for providing HARQ functionality in system access communications. At 702, a random access preamble can be transmitted to one or more access points to facilitate system access, as described previously. At 704, a control channel communication with an uplink grant can be received that is addressed to a temporary address. Since contention is not yet resolved, this grant can be considered a retransmission, and thus at 706, the random access response can be provided to the HARQ process with a retransmission indication.

It will be appreciated that, in accordance with one or more aspects described herein, inferences can be made regarding determining whether to indicate a new transmission or retransmission for the various system access messages regardless of specified NDIs, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
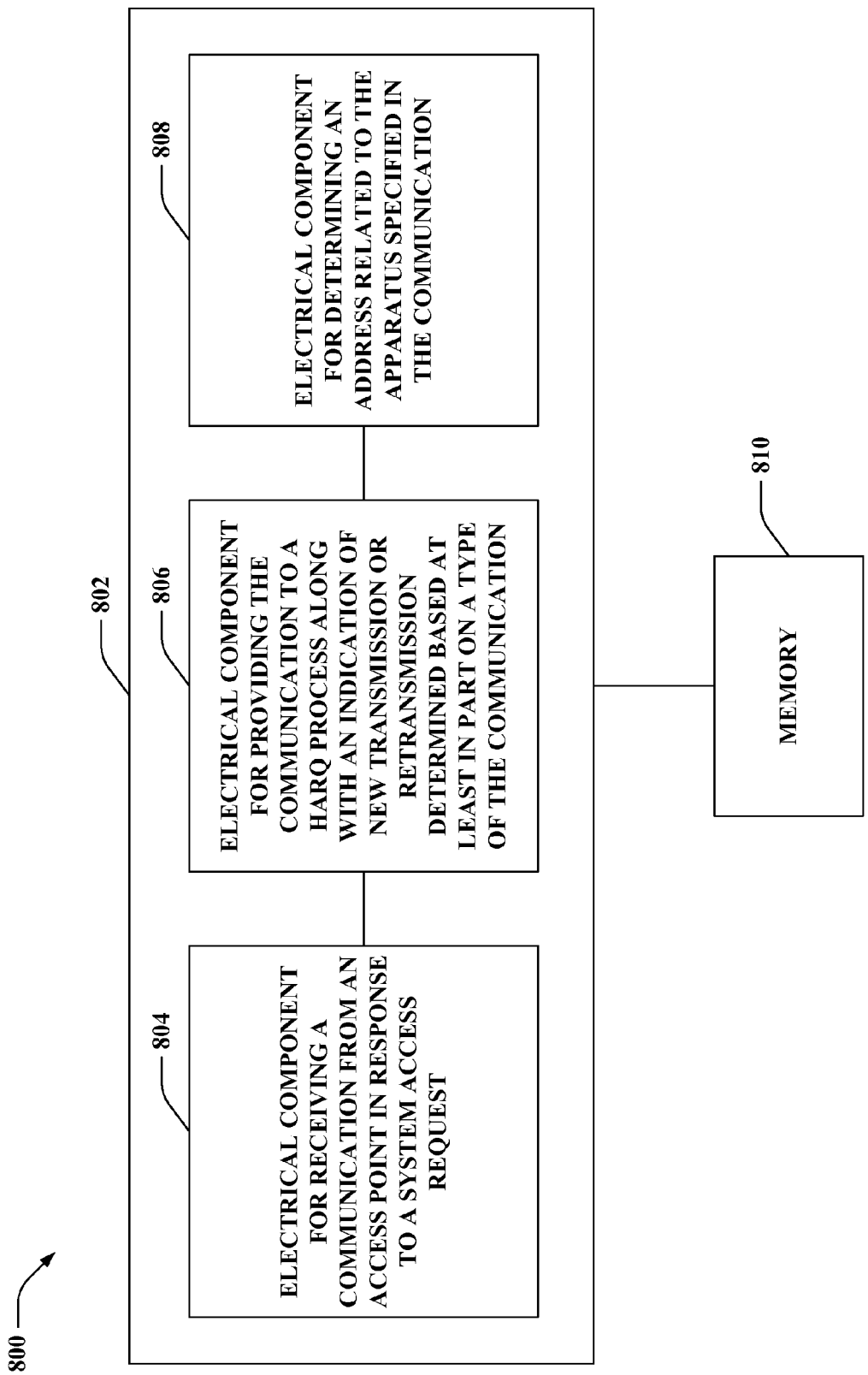
FIG. 8 is a block diagram of an example apparatus that facilitates providing HARQ communication in system access procedures.

With reference to FIG. 8, illustrated is a system 800 that implements HARQ communication for system access procedures. For example, system 800 can reside at least partially within a base station, mobile device, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for receiving a communication from an access point in response to a system access request 804. For example, this can be a system access response (e.g., RACH response), control channel communication, and/or the like. Further, logical grouping 802 can comprise an electrical component for providing the communication to a HARQ process along with an indication of new transmission or retransmission determined based at least in part on a type of the communication 806. As described, a random access response with a resource grant can be a new transmission, a control channel transmission with a grant can be a retransmission where addressed to a temporary address, and/or the like.

Furthermore, logical grouping 802 can include an electrical component for determining an address related to the apparatus specified in the communication 808. Thus, the address can be temporary or persistent and can be utilized to further determine whether the communication should be indicated as a new transmission or retransmission, as described previously. Additionally, system 800 can include a memory 810 that retains instructions for executing functions associated with electrical components 804, 806, and 808. While shown as being external to memory 810, it is to be understood that one or more of electrical components 804, 806, and 808 can exist within memory 810.

Figure 9:
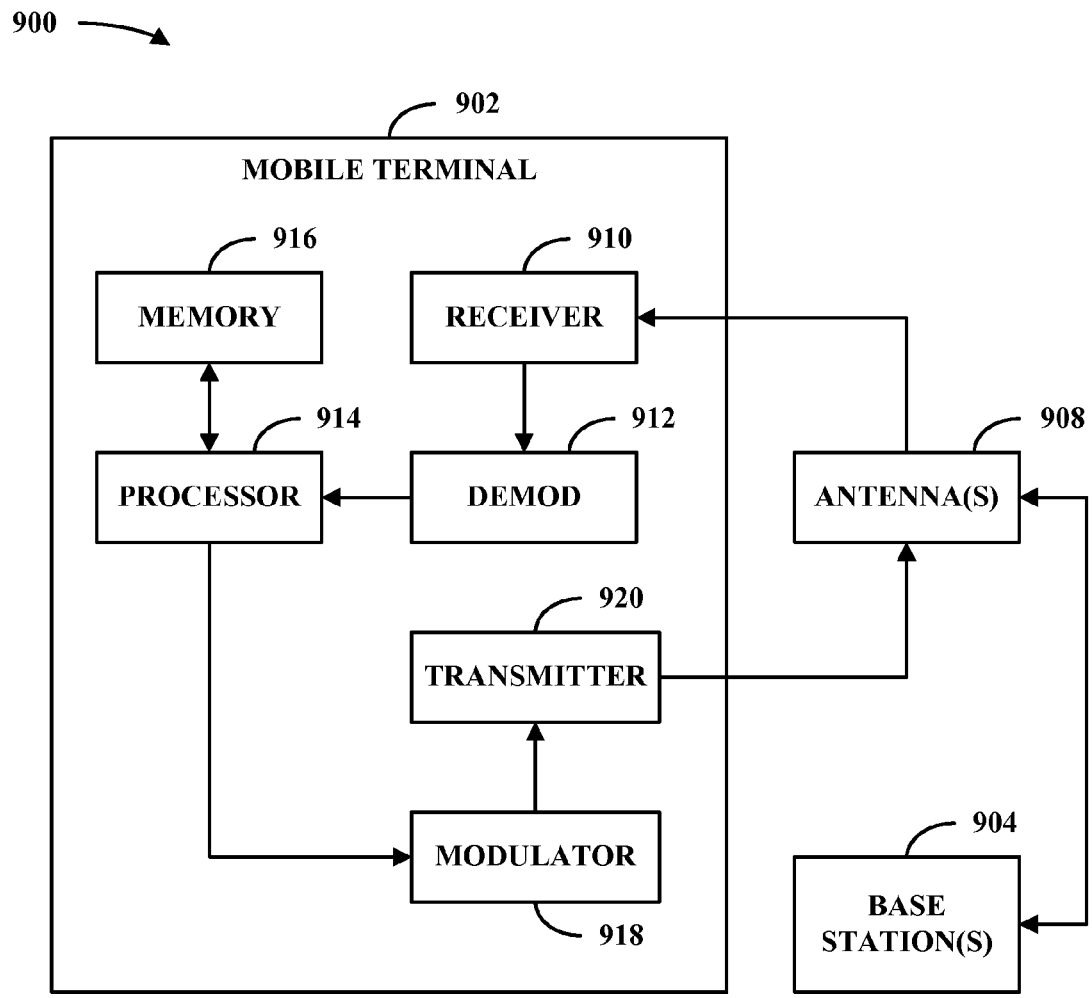
FIG. 9 is a block diagram of an example wireless communication device that can be utilized to implement various aspects of the functionality described herein.

FIG. 9 is a block diagram of another system 900 that can be utilized to implement various aspects of the functionality described herein. In one example, system 900 includes a mobile terminal 902. As illustrated, mobile terminal 902 can receive signal(s) from one or more base stations 904 and transmit to the one or more base stations 904 via one or more antennas 908. Additionally, mobile terminal 902 can comprise a receiver 910 that receives information from antenna(s) 908. In one example, receiver 910 can be operatively associated with a demodulator (Demod) 912 that demodulates received information. Demodulated symbols can then be analyzed by a processor 914. Processor 914 can be coupled to memory 916, which can store data and/or program codes related to mobile terminal 902. Additionally, mobile terminal 902 can employ processor 914 to perform methodologies 500, 600, 700, and/or other similar and appropriate methodologies. Mobile terminal 902 can also employ one or more components described in previous figures to effectuate the described functionality; in one example, the components can be implemented by the processor 914. Mobile terminal 902 can also include a modulator 918 that can multiplex a signal for transmission by a transmitter 920 through antenna(s) 908.

Figure 10:
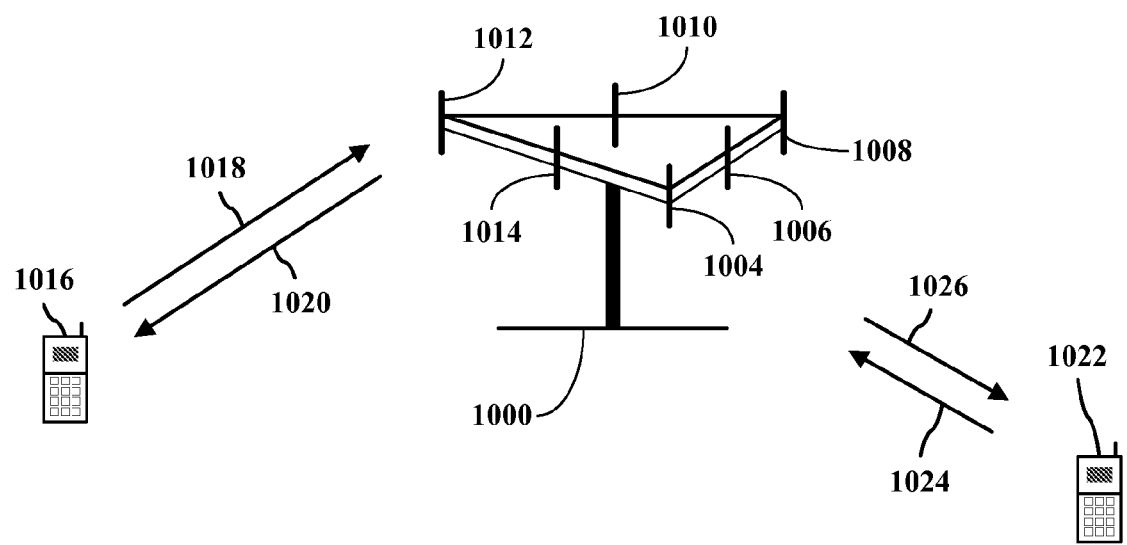
FIG. 10 illustrates an example wireless multiple-access communication system in accordance with various aspects set forth herein.

Referring now to FIG. 10, an illustration of a wireless multiple-access communication system is provided in accordance with various aspects. In one example, an access point 1000 (AP) includes multiple antenna groups. As illustrated in FIG. 10, one antenna group can include antennas 1004 and 1006, another can include antennas 1008 and 1010, and another can include antennas 1012 and 1014. While only two antennas are shown in FIG. 10 for each antenna group, it should be appreciated that more or fewer antennas may be utilized for each antenna group. In another example, an access terminal 1016 can be in communication with antennas 1012 and 1014, where antennas 1012 and 1014 transmit information to access terminal 1016 over forward link 1020 and receive information from access terminal 1016 over reverse link 1018. Additionally and/or alternatively, access terminal 1022 can be in communication with antennas 1006 and 1008, where antennas 1006 and 1008 transmit information to access terminal 1022 over forward link 1026 and receive information from access terminal 1022 over reverse link 1024. In a frequency division duplex system, communication links 1018, 1020, 1024 and 1026 can use different frequency for communication. For example, forward link 1020 may use a different frequency then that used by reverse link 1018.

Each group of antennas and/or the area in which they are designed to communicate can be referred to as a sector of the access point. In accordance with one aspect, antenna groups can be designed to communicate to access terminals in a sector of areas covered by access point 1000. In communication over forward links 1020 and 1026, the transmitting antennas of access point 1000 can utilize beamforming in order to improve the signal-to-noise ratio of forward links for the different access terminals 1016 and 1022. Also, an access point using beamforming to transmit to access terminals scattered randomly through its coverage causes less interference to access terminals in neighboring cells than an access point transmitting through a single antenna to all its access terminals.

An access point, e.g., access point 1000, can be a fixed station used for communicating with terminals and can also be referred to as a base station, an eNB, an access network, and/or other suitable terminology. In addition, an access terminal, e.g., an access terminal 1016 or 1022, can also be referred to as a mobile terminal, user equipment, a wireless communication device, a terminal, a wireless terminal, and/or other appropriate terminology.

Figure 11:
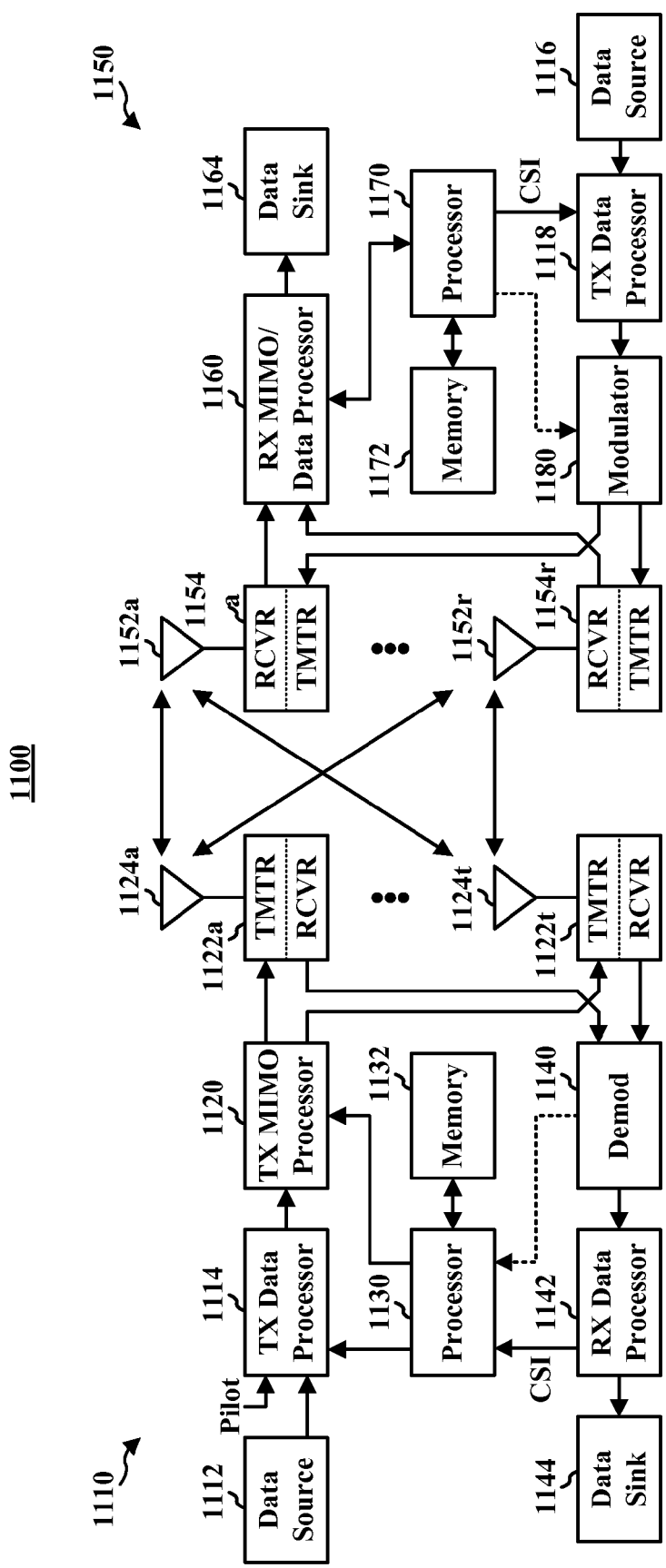
FIG. 11 is a block diagram illustrating an example wireless communication system in which various aspects described herein can function.

Referring now to FIG. 11, a block diagram illustrating an example wireless communication system 1100 in which various aspects described herein can function is provided. In one example, system 1100 is a multiple-input multiple-output (MIMO) system that includes a transmitter system 1110 and a receiver system 1150. It should be appreciated, however, that transmitter system 1110 and/or receiver system 1150 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1110 and/or receiver system 1150 described herein could be utilized in connection with a single output to single input antenna system.

In accordance with one aspect, traffic data for a number of data streams are provided at transmitter system 1110 from a data source 1112 to a transmit (TX) data processor 1114. In one example, each data stream can then be transmitted via a respective transmit antenna 1124. Additionally, TX data processor 1114 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1150 to estimate channel response. Back at transmitter system 1110, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1130.

Next, modulation symbols for all data streams can be provided to a TX processor 1120, which can further process the modulation symbols (e.g., for OFDM). TX MIMO processor 1120 can then provides $N_T$ modulation symbol streams to $N_T$ transceivers 1122a through 1122t. In one example, each transceiver 1122 can receive and process a respective symbol stream to provide one or more analog signals. Each transceiver 1122 can then further condition (e.g., amplify, filter, and upconvert) the analog signals to provide a modulated signal suitable for transmission over a MIMO channel. Accordingly, $N_T$ modulated signals from transceivers 1122a through 1122t can then be transmitted from $N_T$ antennas 1124a through 1124t, respectively.

In accordance with another aspect, the transmitted modulated signals can be received at receiver system 1150 by $N_R$ antennas 1152a through 1152r. The received signal from each antenna 1152 can then be provided to respective transceivers 1154. In one example, each transceiver 1154 can condition (e.g., filter, amplify, and downconvert) a respective received signal, digitize the conditioned signal to provide samples, and then processes the samples to provide a corresponding "received" symbol stream. An RX MIMO/data processor 1160 can then receive and process the $N_R$ received symbol streams from $N_R$ transceivers 1154 based on a particular receiver processing technique to provide $N_T$ "detected" symbol streams. In one example, each detected symbol stream can include symbols that are estimates of the modulation symbols transmitted for the corresponding data stream. RX processor 1160 can then process each symbol stream at least in part by demodulating, deinterleaving, and decoding each detected symbol stream to recover traffic data for a corresponding data stream. Thus, the processing by RX processor 1160 can be complementary to that performed by TX MIMO processor 1120 and TX data processor 1116 at transmitter system 1110. RX processor 1160 can additionally provide processed symbol streams to a data sink 1164.

In accordance with one aspect, the channel response estimate generated by RX processor 1160 can be used to perform space/time processing at the receiver, adjust power levels, change modulation rates or schemes, and/or other appropriate actions. Additionally, RX processor 1160 can further estimate channel characteristics such as, for example, signal-to-noise-and-interference ratios (SNRs) of the detected symbol streams. RX processor 1160 can then provide estimated channel characteristics to a processor 1170. In one example, RX processor 1160 and/or processor 1170 can further derive an estimate of the "operating" SNR for the system. Processor 1170 can then provide channel state information (CSI), which can comprise information regarding the communication link and/or the received data stream. This information can include, for example, the operating SNR. The CSI can then be processed by a TX data processor 1118, modulated by a modulator 1180, conditioned by transceivers 1154a through 1154r, and transmitted back to transmitter system 1110. In addition, a data source 1116 at receiver system 1150 can provide additional data to be processed by TX data processor 1118.

Back at transmitter system 1110, the modulated signals from receiver system 1150 can then be received by antennas 1124, conditioned by transceivers 1122, demodulated by a demodulator 1140, and processed by a RX data processor 1142 to recover the CSI reported by receiver system 1150. In one example, the reported CSI can then be provided to processor 1130 and used to determine data rates as well as coding and modulation schemes to be used for one or more data streams. The determined coding and modulation schemes can then be provided to transceivers 1122 for quantization and/or use in later transmissions to receiver system 1150. Additionally and/or alternatively, the reported CSI can be used by processor 1130 to generate various controls for TX data processor 1114 and TX MIMO processor 1120. In another example, CSI and/or other information processed by RX data processor 1142 can be provided to a data sink 1144.

In one example, processor 1130 at transmitter system 1110 and processor 1170 at receiver system 1150 direct operation at their respective systems. Additionally, memory 1132 at transmitter system 1110 and memory 1172 at receiver system 1150 can provide storage for program codes and data used by processors 1130 and 1170, respectively. Further, at receiver system 1150, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for interpreting hybrid automatic repeat/request (HARQ) functionality in system access procedures, comprising:
   receiving, at a device, a communication comprising a grant of data channel resources for communicating over a wireless network from an access point in the wireless network;
   determining whether the grant in the communication is associated with a new transmission or a retransmission based at least in part on a communication type; and
   providing the communication to a HARQ process along with an indicator for the new transmission based on the determination and whether a buffer of the HARQ process comprises a response to a system access response.

2. The method of claim 1, wherein the communication is a random access response.

3. The method of claim 2, further comprising transmitting a random access request to the access point when switching from an idle mode to an active mode, wherein the communication is received in response to the random access request.

4. The method of claim 1, wherein the communication type is a control channel transmission and the method further comprising determining an identifier associated with the control channel transmission.

5. The method of claim 4, wherein when the identifier is a temporary identifier related to the device, the communication is provided to the HARQ process along with an indication of the retransmission.

6. The method of claim 1, wherein the communication further comprises an identifier related to the HARQ process.

7. A wireless communications apparatus, comprising:
at least one processor configured to:
receive, at a device, a response to a system access request comprising a grant of data channel resources from an access point in a wireless network;
determine whether the grant in the response is associated with a new transmission or a retransmission based at least in part on a response type; and
provide the response to a hybrid automatic repeat/request (HARQ) process along with an indicator for the new transmission based at least in part on the type of the determination and whether a buffer of the HARQ process comprises a response to a system access response; and
a memory coupled to the at least one processor.

8. The wireless communications apparatus of claim 7, wherein the system access request is a random access preamble, and the at least one processor determines the response is a random access response.

9. The wireless communications apparatus of claim 7, wherein the at least one processor determines the response type, which comprises an associated identifier related to the wireless communications apparatus.

10. The wireless communications apparatus of claim 9, wherein the at least one processor is further configured to determine whether the identifier is a temporary or persistent identifier.

11. The wireless communications apparatus of claim 10, wherein when the identifier is a temporary identifier, the at least one processor provides the response to the HARQ process along with an indication of the retransmission.

12. An apparatus that facilitates utilizing hybrid automatic repeat/request (HARQ) communications in system access procedures, comprising:
means for receiving, at a device, a communication from an access point in response to a system access request;
means for determining whether a grant in the communication is associated with a new transmission or a retransmission based at least in part on a communication type; and
means for providing the communication to a HARQ process along with an indicator for the new transmission based at least in part on the determination and whether a buffer of the HARQ process comprises a response to a system access response.

13. The apparatus of claim 12, wherein the communication is a random access response.

14. The apparatus of claim 13, wherein the means for receiving a communication receives the communication over an established random access channel in response to a random access preamble transmitted over the established random access channel.

15. The apparatus of claim 12, wherein the communication type is a control channel transmission.

16. The apparatus of claim 15, wherein the means for providing the communication to a HARQ process further determines an identifier related to the apparatus specified in the communication.

17. The apparatus of claim 16, wherein when the means for providing the communication to a HARQ process determines that the identifier is a temporary address related to the device, the means for providing provides the communication to the HARQ process along with an indication of the retransmission.

18. The apparatus of claim 12, wherein the communication further comprises an identifier related to the HARQ process.

19. A computer program product, comprising:
a non-transitory computer-readable medium comprising:
code for causing at least one computer to receive, at a device, a communication comprising a grant of data channel resources from an access point in a wireless network;
code for causing the at least one computer to determine whether the grant in the communication is associated with a new transmission or a retransmission based at least in part on a communication type; and
code for causing the at least one computer to provide the communication to a hybrid automatic repeat/request (HARQ) process along with an indicator for the new transmission based on the determination and whether a buffer of the HARQ process comprises a response to a system access response.

20. The computer program product of claim 19, wherein the communication is a random access response.

21. The computer program product of claim 20, wherein the non-transitory computer-readable medium further comprises code for causing the at least one computer to transmit a random access request to the access point when switching from an idle mode to an active mode, wherein the communication is received in response to the random access request.

22. The computer program product of claim 19, wherein the communication type is a control channel transmission and the non-transitory computer-readable medium further comprises code for causing the at least one computer to determine an identifier associated with the control channel transmission.

23. The computer program product of claim 22, wherein when the identifier is a temporary address related to a device, the communication is provided to the HARQ process along with an indication of the retransmission.

* * * * *